United States Patent
Oh et al.

(10) Patent No.: US 6,855,786 B2
(45) Date of Patent: Feb. 15, 2005

(54) METHOD FOR PREPARING GRAFT COPOLYMER OF METHYLMETHACRYLATE-BUTADIENE-STYRENE HAVING SUPERIOR ANTI-STRESS WHITENING PROPERTIES

(75) Inventors: Joo-Sik Oh, Yeosoo (KR); Sung-Koo Noh, Yeosoo (KR); Ok-Youl Jeong, Yeosoo (KR)

(73) Assignee: LG Chemical Co., Ltd., Seoul (KR)

( * ) Notice: Subject to any disclaimer, the term of this patent is extended or adjusted under 35 U.S.C. 154(b) by 0 days.

(21) Appl. No.: 10/168,721
(22) PCT Filed: Oct. 26, 2001
(86) PCT No.: PCT/KR01/01822
§ 371 (c)(1), (2), (4) Date: Jun. 21, 2002
(87) PCT Pub. No.: WO02/34806
PCT Pub. Date: May 2, 2002

(65) Prior Publication Data
US 2003/0027916 A1 Feb. 6, 2003

(30) Foreign Application Priority Data
Oct. 27, 2000 (KR) .................. 2000-63410

(51) Int. Cl.⁷ .............. C08F 279/06; C08F 279/04; C08F 279/02
(52) U.S. Cl. .............. 526/201; 523/201; 524/458; 525/242; 525/902; 526/328.5; 526/329.2; 526/329.7
(58) Field of Search ............ 525/201, 242, 525/902; 524/458; 526/201, 328.5, 329.2, 329.7

(56) References Cited

U.S. PATENT DOCUMENTS

| 4,352,910 A | 10/1982 | Katto et al. |
| 4,431,772 A | 2/1984 | Katto et al. |
| 4,857,592 A | 8/1989 | Hoshino et al. |
| 6,331,580 B1 * | 12/2001 | Molnar .................. 523/201 |

FOREIGN PATENT DOCUMENTS

| JP | 54-133588 | 10/1979 |
| JP | 09-003142 | 1/1997 |
| JP | 09-296015 | 11/1997 |

* cited by examiner

Primary Examiner—Kelechi C. Egwim
(74) Attorney, Agent, or Firm—Alston & Bird LLP

(57) ABSTRACT

The present invention relates to a method of preparing an impact-reinforcement agent for polyvinylchloride (PVC) resin having superior anti-stress whitening properties, and specifically to a method for preparing a graft copolymer of methyl-methacrylate-butadiene-styrene (MBS) comprising 3 steps of graft-copolymerizing monomers such as alkylmethacrylate, acrylate, and an ethylene-unsaturated aromatic compound to a rubber latex, in sequence.

6 Claims, No Drawings

METHOD FOR PREPARING GRAFT COPOLYMER OF METHYLMETHACRYLATE-BUTADIENE-STYRENE HAVING SUPERIOR ANTI-STRESS WHITENING PROPERTIES

BACKGROUND OF THE INVENTION (a) Field of the Invention

The present invention relates to a polyvinylchloride (PVC)-based impact modifier with superior anti-stress whitening properties. More particularly, this invention relates to a method for preparing a graft copolymer of methylmethacrylate-butadiene-styrene (MBS) having highly-balanced impact strength, transparency, anti-stress whitening, and processability, when it is applied to a polyvinylchloride resin composition.

(b) Description of the Related Art

Polyvinylchloride (PVC) is a polymer that contains more than 50% of vinylchloride, and thus it has a drawback of being brittle upon impact. In order to improve such a drawback of PVC resin, various methods have been studied heretofore. Improvements of impact resistance can be achieved, for example, by grafting monomers such as styrene, methylmethacrylate or acrylonitrile to a butadiene-based rubber latex. However, in this case, drawbacks exist in that transparency of the product is impaired and that stress-whitening can take place when it is molded into a sheet.

It is known that the properties of methylmethacrylate-butadiene-styrene (MBS) resin are significantly affected by the content of each of the monomers which form a graft polymer, the polymerizing method, and the content and particle size of the rubber latex which is used as a basic material. It is a general method to increase both the content and the particle size of rubber latex in order to improve impact strength, however, in this case, the transparency tends to be impaired due to the increase of the degree of scattering from the enlarged particle size of graft polymer particles dispersed in PVC resin. Moreover, when the refractive index of PVC resin and that of the graft polymer particle are quite different, or when deformation is carried out, micro-voids can be easily formed due to the weakening of binding forces between MBS resin and PVC resin, which causes the problem of an increase in stress whitening.

There has been much research undertaken with regard to the content and particle size of rubber particle, graft polymerizing methods, and compositions, in order to obtain graft copolymer particles having superior impact resistance and anti-stress whitening, and it is already known that when the usage of rubber latex in particular is restricted, transparency and impact strength of the product is significantly influenced by the monomer content which is subjected to grafting and the process.

Examples of prior arts include a process for improving anti-stress whitening and impact strength by controlling both a degree of swelling and the refractive index of rubber polymer (U.S. Pat. No. 4,431,772 to Katto et al.), by applying multi-step polymerization (U.S. Pat. No. 4,352,910 to Katto et al.), and by controlling monomers to be grafted stepwise (U.S. Pat. No. 4,857,592 to Hoshino et al.), and all these processes have in common the use of a cross-linking agent during graft polymerization. However, for all these attempts, the properties of PVC resin including grafted particles are restricted by the formation of protrusions such as un-dispersed fish-eyes, which are attributed to process parameters in connection with operation conditions and the like.

SUMMARY OF THE INVENTION

In consideration of abovementioned problems, it is an object of the present invention to provide a method for preparing a methylmethacrylate-butadiene-styrene graft copolymer having superior impact resistance, transparency, anti-stress whitening, and processability by conducting 3-steps of graft polymerization in which monomers such as alkyl methacrylate, acrylate and an ethylene unsaturated aromatic compound are grafted to rubber latex in sequence.

In order to achieve the above object, a method for preparing a methylmethacrylate-butadiene-styrene having superior anti-stress whitening properties is provided, the method comprising steps of:

a) preparing a first-stage polymer by graft polymerizing 70 to 80 parts by weight of rubber latex with addition of 5 to 25 parts by weight of alkyl methacrylate;

b) preparing a second-stage polymer by graft polymerizing the first-stage polymer prepared in step a) with addition of 0.0001 to 5 parts by weight of acrylate; and c) preparing a third-stage polymer by graft polymerizing the second-stage polymer prepared in step b) with addition of 5 to 30 parts by weight of ethylene unsaturated aromatic compound and not more than 5 parts by weight of a graft cross-linking agent.

DETAILED DESCRIPTION OF THE PREFERRED EMBODIMENTS

A preferred embodiment of this invention will be explained in the following.

The rubber latex used in the present invention is a styrene-butadiene rubber, which can be prepared by means of conventional emulsion polymerization using butadiene or isoprene as a main component, along with 1 to 3 kinds of other vinyl-based monomers. Vinyl-based monomers available as raw materials in copolymerization are used to meet the requirement of controlling the refractive index of copolymers or of rendering copolymers to have a cross-linked structure. The content and type of the vinyl-based monomers used in copolymerization may be varied in accordance with desired properties of products, and the monomers of at least 35% of the finished copolymer can be used.

Preferably, a styrene-butadiene copolymer rubber comprises:

(i) 65 to 85 parts by weight of butadiene;

(ii) 5 to 35 parts by weight of a vinyl-based monomer; and, optionally, (iii) at least 5 parts by weight of a monomer to be used as a graft cross-linking agent.

Examples of the vinyl-based monomer (ii) used for the styrene-butadiene rubber are styrene, acrylonitrile, divinylbenzene, alkylacrylate-based ethylacrylate, and butylacrylate, and among them, one or more monomers, and more advantageously a combination of more than two kinds of monomers can be used.

The graft cross-linking agent can be at least one selected from the group consisting of divinylbenzene, ethylene glycol dimethacrylate, diethylene glycol dimethacrylate, triethylene glycol dimethacrylate, 1,3-butylene glycol dimethacrylate, arylmethacrylate, and 1,3-butylene glycol diacrylate. The amount of the graft cross-linking agent to be used is no more than 5 parts, and preferably 0.1 to 2.0 parts is used for, the improvement of transparency and anti-stress whitening.

The graft polymerization may be carried out in a series steps of:

a) preparing a first-stage polymer by graft polymerizing 70 to 80 parts by weight of rubber latex with addition of 5 to 25 parts by weight of alkylmethacrylate;

b) preparing a second-stage polymer by graft polymerizing the first-stage polymer prepared in step a) with addition of 0.0001 to 5 parts by weight of acrylate; and c) preparing a third-stage polymer by graft polymerizing the second-stage polymer prepared in step b) with addition of 5 to 30 parts by weight of ethylene unsaturated aromatic compound and not more than 5 parts by weight of graft cross-linking agent, whereby it is possible to prevent transparency, impact resistance, and anti-stress whitening from being deteriorated.

The graft cross-linking agent used optionally in step c) contributes to increasing adaptability of impact modifiers to PVC-based resin by increasing the content of monomers being grafted, and it is used in the range of not more than 5 parts, preferably not more than 2.0 parts.

The present invention will be described in further detail with reference of the following examples and comparative examples. However, it should be understood that these examples are presented as being illustrative only and are not intended to limit the scope of the invention. The term "parts" and "%" used as in the following examples refer to "parts by weight" and "% by weight" unless otherwise specified.

EXAMPLES

In the examples of the present invention, a graft copolymer prepared by the above-mentioned methods was mixed with an antioxidant and an acid was added thereto while stirring and heating, and after separation of water from polymer, the product was filtered and dried to give MBS power, which was mixed with PVC-based resin to be subjected to analysis.

A masterbatch of PVC-based resin was a product comprising 100 parts of polyvinylchloride resin (degree of polymerization: 800), 1.5 parts of tin-based heat stabilizer, 1.0 parts of an internal lubricant, 0.5 parts of an external lubricant, 0.5 parts of an processing aid, and 0.3 parts of colarant, and before use, it was thoroughly mixed at 130° C. by means of a high speed agitator and then cooled.

The content of impact modifier introduced for evaluation of PVC-based resin according to the invention was 7 parts among 100 parts of PVC-based resin, and it was fabricated into a sheet having a thickness of 3 mm through a roll and a heat-press operating at 190° C. The thus-prepared sheet was precisely cut to give test pieces for the test of Izod impact resistance and light transmittance according to ASTM standards, and light transmittance and haze were determined by means of a haze-meter.

The anti-stress whitening property was determined by using a Falling Dart machine in such a manner that variation of transparency was measured while varying the test piece having a weight of 9 kg and a diameter of 20 mm to 3 m/sec. The value of the anti-stress whitening property was calculated according to the following equation, wherein the lower the value the better the anti-stress whitening.

Degree anti-stress whitening=[(transparency before varying−transparency after varying)/(transparency before varying)]×100

Example 1

Preparation of Methylmethacrylate-Butadiene-Styrene Graft Copolymer (Preparation of Rubber Latex)

150 parts of deionized water, and as additives, 0.5 parts of a buffer solution, 0.8 parts of potassium oleate, 0.0047 parts of ethylenediamine tetrasodium acetate, 0.003 parts of ferrous sulfate, 0.02 parts of sodium formaldehyde sulfoxylate, and 0.11 parts of diisopropyl benzene hydroperoxide were initially charged into a 120 L pressurized polymerization vessel equipped with a stirrer.

As a first step, 20 parts of butadiene, 20 parts of styrene, and 0.2 parts of divinylbenzene were added to the above mixture and polymerization was conducted at 35° C. When the polymerization conversion of the charged monomers exceeded 90%, 52 parts of butadiene, 7.5 parts of styrene, 0.3 parts of divinylbenzene, and 0.3 parts of potassium oleate were added as a second step and polymerization was conducted for 10 hours, whereby a styrene-butadiene rubber latex having a particle size of 1020 Å was obtained, its final polymerization conversion being 98%.

(First-stage Polymerization)

70 parts (solid content) of the above obtained rubber latex was charged to a reactor with a closed end, and then it was filled with nitrogen and 11.5 parts of methylmethacrylate, and as additives, 0.2 parts of potassium oleate, 0.01 parts of sodium formaldehyde sulfoxylate, and 0.08 parts of t-butyl hydroperoxide were added thereto and the mixture was continuously charged to the rubber latex at 70° C. for 30 minutes, and then polymerization was conducted for 1 hour.

(Second-Stage Polymerization)

2.5 parts of ethyl acrylate, and as additives, 0.2 parts of potassium oleate, 0.01 parts of sodium formaldehyde sulfoxylate, and 0.08 parts of t-butyl hydroperoxide were added to the polymer obtained from the first stage polymerization and the mixture was continuously charged to the rubber latex at 70° C. for 30 minutes, and then polymerization was conducted for 1 hour.

(Third-stage Polymerization)

16 parts of styrene, and as additives, 0.2 parts of potassium oleate, 0.01 parts of sodium formaldehyde sulfoxylate, and 0.08 parts of t-butyl hydroperoxide were added to the polymer obtained from the second stage polymerization and the mixture was continuously charged to the rubber latex at 70° C. for 30 minutes, and then polymerization was conducted for 2 hours.

As a result of the above described polymerization process, 100 parts of the product, the same amount of the latex monomer which was charged, was obtained

Example 2 and 3, Comparative Example 1 and 2

(Preparation in Example 2)

The same process as Example 1 was used with 75 parts of rubber latex, 9 parts of methylmethacrylate, 2.5 parts of ethyl acrylate, and 13.5 parts of styrene.

(Preparation in Example 3)

The same process as Example 1 was used with 80 parts of rubber latex, 6.5 parts of methylmethacrylate, 2.5 parts of ethyl acrylate, and 11 parts of styrene.

(Preparation in Comparative Example 1)

The same process as Example 1 was used with 87 parts of rubber latex, 3 parts of methylmethacrylate, 2.5 parts of ethyl acrylate, and 7.5 parts of styrene.

(Preparation in Comparative Example 2)

The same process as Example 1 was used with 63 parts of rubber latex, 15.2 parts of methylmethacrylate, 2.5 parts of ethyl acrylate, and 19.3 parts of styrene.

Properties of the products of Examples 2 and 3, and Comparative Examples 1 and 2 as described above, in which different compositions of each of the rubber latex and monomers were used, were measured on their Izod impact strength (23° C.), transparency, haze, and anti-stress whitening and the results are shown in Table 1.

TABLE 1

|  | Example 1 | Example 2 | Example 3 | Comparative Example 1 | Comparative Example 2 |
| --- | --- | --- | --- | --- | --- |
| Izod impact strength (23° C.) | 76 | 87 | 90 | 95 | 35 |
| Transparency | 65.5 | 65.3 | 65.0 | 64.2 | 66 |
| Haze | 7.0 | 8.2 | 10.3 | 23.0 | 5.2 |
| Anti-stress Whitening | 6.3 | 8.5 | 11 | 20.2 | 4.0 |

From Table 1, it is understood that the products of Examples 1, 2 and 3, in which an appropriate composition for a methylmethacrylate-butadiene-styrene graft copolymer having superior anti-stress whitening, that is, 70–80 parts of rubber latex, 5–25 parts of alkyl methacrylate, 0–5 parts of acrylate, and 5–30 parts of ethylene unsaturated aromatic compound are included, are superior in impact resistance, transparency, haze, and anti-stress whitening.

Comparative Example 3 and 4

Preparation in Comparative Example 3

(First-stage Polymerization)

2.5 parts of ethyl acrylate, and as additives, 0.2 parts of potassium oleate, 0.01 parts of sodium formaldehyde sulfoxylate, and 0.08 parts of t-butyl hydroperoxide were continuously added to 75 parts (solid content) of rubber latex at 70° C. for 30 minutes, and then polymerization was conducted for 1 hour.

(Second-stage Polymerization)

13.5 parts of styrene, and as additives, 0.2 parts of potassium oleate, 0.01 parts of sodium formaldehyde sulfoxylate, and 0.08 parts of t-butyl hydroperoxide were added to the polymer obtained from the first-stage polymerization, and the mixture was continuously added to the rubber latex at 70° C. for 30 minutes, and then polymerization was conducted for 1 hour.

(Third-stage Polymerization)

9 parts of methylmethacrylate, and as additives, 0.2 parts of potassium oleate, 0.01 parts of sodium formaldehyde sulfoxylate, and 0.08 parts of t-butyl hydroperoxide were added to the polymer obtained from the second-stage polymerization, and the mixture was continuously added to the rubber latex at 70° C. for 30 minutes, and then polymerization was conducted for 2 hours.

Preparation in Comparative Example 4

(First-stage Polymerization)

13.5 parts of styrene, and as additives, 0.2 parts of potassium oleate, 0.01 parts of sodium formaldehyde sulfoxylate, and 0.08 parts of t-butyl hydroperoxide were continuously added to 75 parts (solid content) of rubber latex at 70° C. for 30 minutes, and then polymerization was conducted for 1 hour.

(Second-stage Polymerization)

9 parts of methylmethacrylate, and as additives, 0.2 parts of potassium oleate, 0.01 parts of sodium formaldehyde sulfoxylate, and 0.08 parts of t-butyl hydroperoxide were added to the polymer obtained from the first-stage polymerization, and the mixture was continuously added to the rubber latex at 70° C. for 30 minutes, and then polymerization was conducted for 1 hour.

(Third-stage Polymerization)

2.5 parts of ethyl acrylate, and as additives, 0.2 parts of potassium oleate, 0.01 parts of sodium formaldehyde sulfoxylate, and 0.08 parts of t-butyl hydroperoxide were added to the polymer obtained from the second-stage polymerization and the mixture was continuously added to the rubber latex at 70° C. for 30 minutes, and then polymerization was conducted for 2 hours.

Properties of the products of Comparative Examples 3 and 4 as described above, in which the sequence of graft polymerization was altered, were measured on their Izod impact strength (23° C.), transparency, haze, and anti-stress whitening and compared with the same of Example 2. The results are shown in Table 2.

TABLE 2

|  | Izod impact Strength (23° C.) | Transparency | Haze | Anti-stress whitening |
| --- | --- | --- | --- | --- |
| Example 2 | 87 | 65.3 | 8.2 | 8.5 |
| Comparative Example 3 | 73 | 64.2 | 13.2 | 15 |
| Comparative Example 4 | 67 | 65.3 | 15.7 | 14.7 |

As shown in Table 2, it is understood that Izod impact strength, transparency, haze, and anti-stress whitening of the products of Comparative Examples 3 and 4, in which the sequence of graft polymerization was altered, are inferior to the same of Example 2.

Example 4, Comparative Examples 5 and 6

Preparation in Example 4

(First-stage Polymerization)

11 parts of methylmethacrylate, and as additives, 0.2 parts of potassium oleate, 0.01 parts of sodium formaldehyde sulfoxylate, and 0.08 parts of t-butyl hydroperoxide were continuously added to 73 parts (solid content) of rubber latex at 70° C. for 30 minutes, and then polymerization was conducted for 1 hour.

(Second-stage Polymerization)

1.5 parts of butylacrylate, and as additives, 0.2 parts of potassium oleate, 0.01 parts of sodium formaldehyde sulfoxylate, and 0.08 parts of t-butyl hydroperoxide were added to the polymer obtained from the first-stage polymerization, and the mixture was continuously added to the rubber latex at 70° C. for 30 minutes, and then polymerization was conducted for 1 hour.

(Third-stage Polymerization)

14.5 parts of styrene, and as additives, 0.2 parts of potassium oleate, 0.01 parts of sodium formaldehyde sulfoxylate, and 0.08 parts of t-butyl hydroperoxide were added to the polymer obtained from the second-stage polymerization, and the mixture was continuously added to the rubber latex at 70° C. for 30 minutes, and then polymerization was conducted for 2 hours.

Preparation in Comparative Example 5
(First-stage Polymerization)

11 parts of methylmethacrylate, and as additives, 0.35 parts of potassium oleate, 0.015 parts of sodium formaldehyde sulfoxylate, and 0.118 parts of t-butyl hydroperoxide were continuously added to 73 parts of rubber latex (solid content) for 45 minutes, and then polymerization was conducted for 2 hours.

(Second-stage Polymerization)

Mixed monomers comprising 1.5 parts of butylacrylate and 14.5 parts of styrene, and as additives, 0.2 parts of potassium oleate, 0.01 parts of sodium formaldehyde sulfoxylate, and 0.08 parts of t-butyl hydroperoxide were continuously added to the polymer obtained from the first-stage polymerization for 45 minutes, and then polymerization was conducted for 2 hours.

Preparation in Comparative Example 6
(First-stage Polymerization)

Mixed monomers comprising 11 parts of methylmethacrylate and 1.5 parts of butylacrylate, and as additives, 0.35 parts of potassium oleate, 0.015 parts of sodium formaldehyde sulfoxylate, and 0.118 parts of t-butyl hydroperoxide were continuously added to 73 parts of rubber latex (solid content) for 45 minutes, and then polymerization was conducted for 2 hours.

(Second-stage Polymerization)

14.5 parts of styrene, and as additives, 0.35 parts of potassium oleate, 0.015 parts of sodium formaldehyde sulfoxylate, and 0.118 parts of t-butyl hydroperoxide were continuously added to the polymer obtained from the first-stage polymerization for 45 minutes, and then polymerization was conducted for 2 hours.

Properties of the products of Examples 4, and Comparative Example 5 and 6 according to subdivided graft polymerization stages as described above were measured on their Izod impact strength, transparency, haze, and anti-stress whitening. The results are shown in Table 3.

TABLE 3

|  | Example 4 | Comparative Example 5 | Comparative Example 6 |
|---|---|---|---|
| Izod impact strength (23° C.) | 80 | 87 | 76 |
| Transparency | 65.7 | 65.1 | 64.8 |
| Haze | 8.0 | 9.7 | 9.7 |
| Anti-stress whitening | 8.0 | 14.5 | 16.2 |

As shown in Table 3, it is understood that Izod impact strength, transparency, and anti-stress whitening of the products of Example 4 obtained through the 3 steps of polymerization are superior to the same of Comparative Examples 5 and 6 obtained through 2-stage polymerization.

Example 5 and Comparative Example 7

Preparation in Example 5
(First-stage Polymerization)

9 parts of methylmethacrylate, and as additives, 0.35 parts of potassium oleate, 0.015 parts of sodium formaldehyde sulfoxylate, and 0.118 parts of t-butyl hydroperoxide were continuously added to 75 parts (solid content) of rubber latex at 70° C. for 30 minutes, and then polymerization was conducted for 1 hour.

(Second-stage Polymerization)

2.5 parts of ethylacrylate, and as additives, 0.35 parts of potassium oleate, 0.015 parts of sodium formaldehyde sulfoxylate, and 0.118 parts of t-butyl hydroperoxide were added to the polymer obtained from the first-stage polymerization, and the mixture was continuously added to the rubber latex at 70° C. for 30 minutes, and then polymerization was conducted for 1 hour.

(Third-stage Polymerization)

13 parts of styrene, 0.5 parts of divinylbenzene as a graft cross-linking agent, and as additives, 0.35 parts of potassium oleate, 0.015 parts of sodium formaldehyde sulfoxylate, and 0.118 parts of t-butyl hydroperoxide were added to the polymer obtained from the second-stage polymerization, and the mixture was continuously added to the rubber latex at 70° C. for 30 minutes, and then polymerization was conducted for 2 hours.

Preparation in Comparative Example 7
(First-stage Polymerization)

9 parts of methylmethacrylate, and as additives, 0.35 parts of potassium oleate, 0.015 parts of sodium formaldehyde sulfoxylate, and 0.118 parts of t-butyl hydroperoxide were continuously added to 75 parts (solid content) of rubber latex at 70° C. for 30 minutes, and then polymerization was conducted for 1 hour.

(Second-stage Polymerization)

2.5 parts of ethylacrylate, and as additives, 0.35 parts of potassium oleate, 0.015 parts of sodium formaldehyde sulfoxylate, and 0.118 parts of t-butyl hydroperoxide were added to the polymer obtained from the first-stage polymerization, and the mixture was continuously added to the rubber latex at 70° C. for 30 minutes, and then polymerization was conducted for 1 hour.

(Third-stage Polymerization)

11 parts of styrene, 2.5 parts of divinylbenzene as a graft cross-linking agent, and as additives, 0.35 parts of potassium oleate, 0.015 parts of sodium formaldehyde sulfoxylate, and 0.118 parts of t-butyl hydroperoxide were added to the polymer obtained from the second-stage polymerization, and the mixture was continuously added to the rubber latex at 70° C. for 30 minutes, and then polymerization was conducted for 2 hours.

Properties of the products of Example 5 and Comparative Example 7 as described above, in which the amount of graft cross-linking agent was altered, were measured on their Izod impact strength (23° C.), transparency, haze, and anti-stress whitening and compared with the same of Example 2. The results are shown in Table 4.

TABLE 4

|  | Izod impact Strength (23° C.) | Transparency | Haze | Anti-stress whitening |
|---|---|---|---|---|
| Example 2 | 87 | 65.3 | 8.2 | 8.5 |
| Example 5 | 80 | 66.2 | 7.5 | 6.7 |
| Comparative Example 7 | 69 | 66.5 | 6.5 | 5.2 |

As shown in Table 4, upon comparing the results between Examples 2, 5, and Comparative Example 7, it is understood that when the amount of divinylbenzene used as a cross-linking agent was in the lo appropriate range of 0.1–2.0 parts, transparency of polyvinylchloride resin was improved, but when the amount of divinylbenzene exceeded 2.0 parts, impact strength of the polyvinylchloride composition was deteriorated.

As described above with reference to Examples and Comparative Examples, methylmethacrylate-butadiene-styrene graft copolymer prepared according to the present invention have the effect of providing polyvinylchloride resins that have superior impact resistance, transparency, anti-stress whitening properties, and processability.

What is claimed is:

1. A method for preparing a methylmethacrylate-butadiene-styrene graft copolymer having superior anti-stress whitening properties, the method comprising steps of:
    a) preparing a rubber latex by conducting a polymerization using 65 to 95 parts by weight of butadiene and 5 to 35 parts by weight of vinyl-based monomers until the final polymerization conversion rate is 98% or more;
    b) adding 5 to 25 parts by weight of alkyl methacrylate to 75 to 95 parts by weight of the rubber latex prepared in step a) and conducting graft polymerization on the rubber latex to form a first-stage polymer;
    c) adding 0.0001 to 5 parts by weight of acrylate to 94 to 99.9999 parts by weight of the first-stage polymer prepared in step b) and conducting graft polymerization to form a second-stage polymer; and
    d) adding 5–30 parts by weight of ethylene unsaturated aromatic compound to 70–95 parts by weight of the second-stage polymer prepared in step c) and conducting graft polymerization to form a third-stage polymer.

2. The method according to claim 1, wherein the rubber latex further comprises not more than 5 parts by weight of a graft cross-linking agent.

3. The method according to claim 2, wherein the graft cross-linking agent is at least one selected from the group consisting of divinylbenzene, ethylene glycol dimethacrylate, diethylene glycol dimethacrylate, triethylene glycol dimethacrylate, 1,3-butylene glycol dimethacrylate, arylmethacrylate, and 1,3-butylene glycol diacrylate.

4. The method according to claim 1, wherein the vinyl-based monomer is at least one selected from the group consisting of styrene, acrylonitrile, divinylbenzene, alkylacrylate-based ethylacrylate and butylacrylate.

5. The method according to claim 1, wherein the graft polymerization of step c) is carried out with further addition of not more than 2.0 parts by weight of a graft cross-linking agent.

6. A polyvinylchloride-based resin comprising the methylmethacrylate-butadiene-styrene graft copolymer having superior anti-stress whitening properties prepared by the method according to claim 1, said graft copolymer comprising:
    a) 70 to 80 parts by weight of a rubber latex comprising 65–85 parts by weight of butadiene and 5–35 parts by weight of vinyl-based monomers;
    b) 5–25 parts by weight of alkyl methacrylate monomers;
    c) 0.0001 to 5 parts by weight of acrylate monomers; and
    d) 5 to 30 parts by weight of ethylene unsaturated aromatic compound wherein the alkyl methacrylate monomers, acrylate monomers, and ethylene unsaturated aromatic compounds are sequentially grafted on the rubber latex.

* * * * *